March 10, 1942.  A. R. PARILLA  2,275,462
FLUID SPRING
Filed Feb. 3, 1938
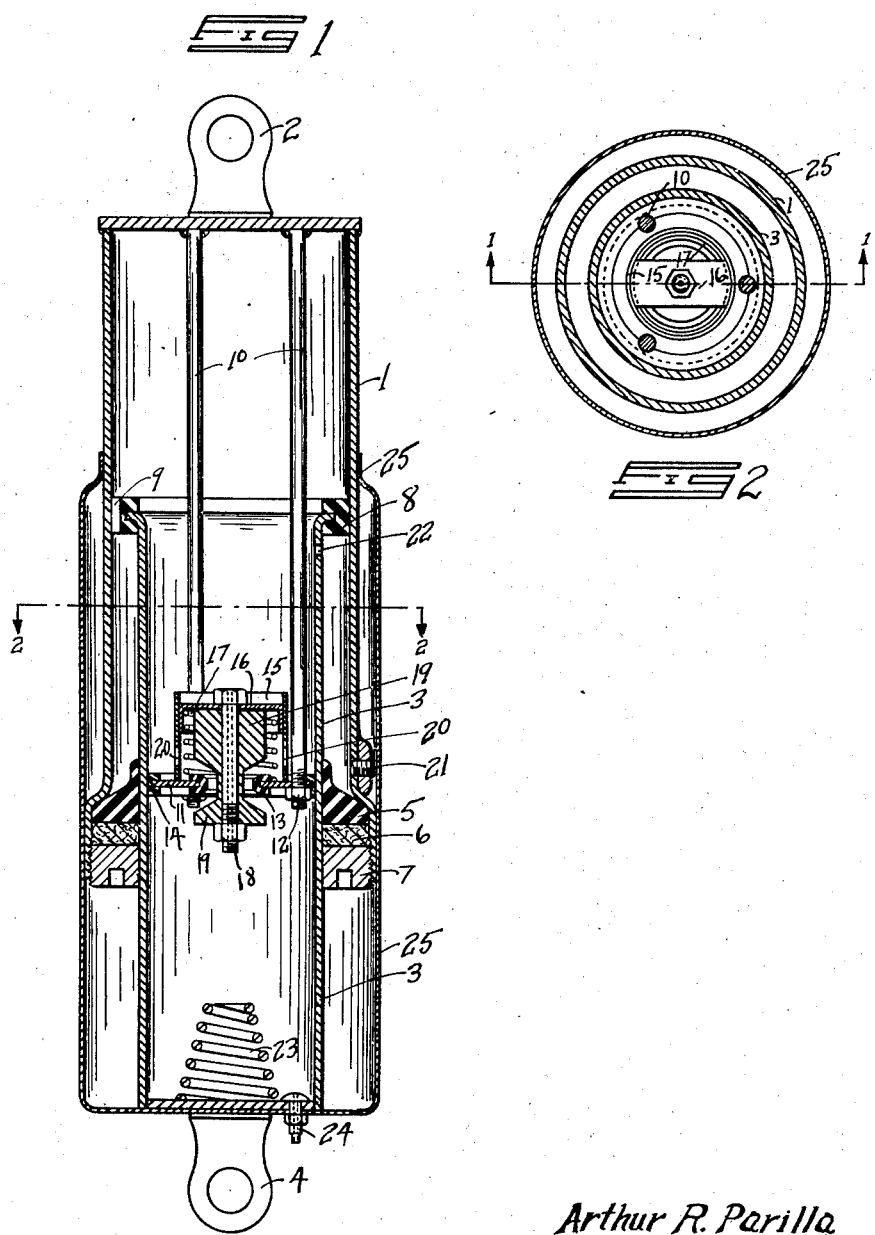
Arthur R. Parilla
INVENTOR
BY
*C. A. Harpman*
ATTORNEY Patented Mar. 10, 1942

2,275,462

UNITED STATES PATENT OFFICE 2,275,462

FLUID SPRING

Arthur R. Parilla, Youngstown, Ohio

Application February 3, 1938, Serial No. 188,439

14 Claims. (Cl. 267—65)

This invention relates to a fluid spring designed for use on automotive vehicles.

The principal object of this invention is the provision of a fluid spring so formed as to provide dual rate springing action.

Another object of this invention is to provide a dual rate spring which has a low resistance to motion when deflection occurs at one end in either direction; but which provides a high resistance to motion for deflection occurring at the opposite end in either direction.

A still further object of this invention is the provision of a fluid spring containing a suitable gas such as air and designed to utilize the compressibility of gases for the spring elasticity.

A still further object of this invention is the provision of a fluid spring, the varying spring rate of which is controlled by automatic valve action.

The spring shown and described herein has been designed to replace both conventional springs and shock absorbers as well as compression and recoil bumpers as used in automotive vehicles. This invention makes use of the compressibility of gases for the spring elasticity. A maximum damping of the body motion is produced only when desired by means of a control valve which produces in effect a spring of dual rate. The change in spring rate results in a desirable change of frequency of body motion resulting in a body motion which is non-harmonic.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:

Figure 1 is a side elevation, in cross section, of the spring showing the various operating parts thereof.

Figure 2 is a cross sectional view taken on line 2—2 of Figure 1, and has cross sectional lines 1—1 representing the position of the cross section shown in Figure 1.

By referring to the drawing, and Figure 1 in particular it will be seen that the spring comprises an upper cylinder 1 which is attached to an automobile frame or body by means of a suitable connection 2. Functioning within the upper cylinder 1 there is a lower cylinder 3 of relatively smaller diameter which is likewise provided with attachment means 4 and connections to a wheel or wheel axle. The lower cylinder 3 is designed to slide within the upper cylinder, and in order that an effective fluid seal may be provided between the two cylinders, a gland 5, preferably formed of rubber, is provided at a point adjacent to the lower flared end of the upper cylinder 1. As additional sealing means at this point there is also provided a ring of graphite packing 6 and a graphite bronze nut 7 threaded into the lower flared end of the upper cylinder 1. At the upper end of the lower cylinder 3 there is provided a ring 8 preferably formed of rubber and serving as a guide or bearing in maintaining proper alignment between the upper end of the lower cylinder 3 and the inner surface of the upper cylinder 1. This ring 8 is provided with a plurality of vertical openings 9 to facilitate the free flow of fluid between the cylinder walls. Centrally positioned within the slidably engaged cylinders 1 and 3 there is a control valve assembly supported by means of support rods 10 having their upper ends attached to the closed upper end of the cylinder 1. This control valve assembly comprises a valve seat 11 which is attached to the lower ends of the support rods 10 by means of nuts 12. This valve seat 11 is provided with a centrally positioned circular opening in which there is positioned a rubber grommet 13. This valve seat 11 is provided at its circumference with a rubber gasket 14. Positioned upon this valve seat 11 and extending upwardly therefrom there is a cylindrical housing 15. Slidably positioned within this cylindrical housing 15 at a point adjacent to the top thereof, there is a guide 16, the sides of which closely contact the cylindrical housing. The guide 16 is carried upon a low rate coil spring 17. Attached to the guide 16 by means of a bolt 18 and extending downwardly through the central opening in the valve seat 11, there is a double faced valve 19, the double faces of which are adapted to engage either the upper or lower surfaces of the grommet 13.

It will be seen that when the device is in normal position as shown in Figure 1, a passageway will exist between the upper and lower cylinders by way of the opening through the grommet 13 and through a plurality of ports 20. This passageway is large enough to permit the unrestricted flow therethrough.

In order that the various parts may be lubricated, means for gaining access thereto are provided, and numeral 21 shows a removable plug which provides lubrication means for the lower cylinder. A smaller opening 22 in the lower cylinder provides means of access to the inside thereof for lubrication purposes.

Positioned in the closed lower end of the lower cylinder 3 there is a conical coil spring 23 which serves as a compression bumper when the lower end of the double faced valve 19 comes in contact therewith as a result of extreme compression within the device. The double faced valve 19 is lifted by the spring 23 against the valve seat 11, thus closing it and creating a cushion. Anticipating maximum expansion of the device, a recoil bumper has been provided in the construction of the rubber ring 8 which compresses against the upper surface of the rubber gland 5 thus limiting further expansion of the device.

As the fluid generally used is a gas such as air, a valve 24 is provided adjacent to the conical spring 23 through which the spring may be inflated. The majority of the operating portions of the spring assembly are provided with a metal housing 25 which extends well up around the cylinder assembly.

When positioned between a car body and a wheel or wheel axle the device acts as follows:

When the car body is at rest the valve assembly is in the position shown in Figure 1. As the wheel rises over a road irregularity, the upward displacement of the lower cylinder 3 compresses the air therein, causing it to flow through the valve by means of the opening through the grommet 13 and the ports 20 into the upper cylinder. These openings are large enough to permit an unrestricted flow and the air is compressed in the entire volume of the two cylinders. This causes a relatively low degree of compression and results in a relatively low spring rate. As the wheel recedes, the resulting downward displacement of the lower cylinder 3 permits the reexpansion of the air and the valve remains undisturbed by the flow of air therethrough.

In the event that the car body moves downwardly and the wheel or wheel axle remains relatively stationary, the valve seat, through its support rods 10, will move downwardly with the body. The double faced valve 19 resting upon the coil spring 17 will tend to momentarily resist this downward movement, after which the valve seat 11 will engage the lower surface of the double faced valve 19, thus closing the passageway through the valve and causing a relatively high degree of compression within the lower cylinder 3. This relatively high degree of compression in the relatively smaller volume of the lower cylinder 3 produces a desirable high spring rate which would tend to stop the downward body motion.

In the event that the car body moves upwardly and the wheel or wheel axle remains relatively stationary, the valve seat, through its support rods 10, will move upwardly with the body. The double faced valve 19 resting upon the coil spring 17 will tend to momentarily resist this upward movement, after which the valve seat 11 will engage the upper surface of the double faced valve 19, thus closing the passageway through the valve and causing a relatively high degree of expansion within the lower cylinder 3. This relatively high degree of expansion in the relatively smaller volume of the lower cylinder 3 produces a desirable high spring rate which would tend to stop the upward body motion.

It will be obvious that any motion created in the upper portion of the device will, through the action of the double faced valve 19, cause a relatively high degree of compression within the lower cylinder 3 only, due to the closing of this valve 19, while motion exerted from the bottom of the device will cause a relatively low degree of compression throughout the entire volume of both the upper and lower cylinders of the device as the double faced valve 19 will remain inoperative.

In the event that during an upward movement of the car body, a simultaneous upward movement of the wheel occurs, it is desirable to maintain the lower spring rate. As the upward body motion starts, the upper face of the double faced valve 19 will seat. This simultaneous upward motion of the wheel, causing the closing up of the cylinders, will start compression within the volume of the lower cylinder 3. This compression will immediately lift the double faced valve 19 and allow the compression to continue uniformly throughout the entire volume of both the upper and lower cylinders, thus producing the desirable low spring rate.

In the event that during an upward movement of the car body, a simultaneous downward movement of the wheel occurs, it is desirable to maintain the higher spring rate. As the upward body motion starts, the upper face of the double faced valve 19 will seat. The simultaneous downward motion of the wheel, causing the spreading apart of the cylinders, will start expansion within the volume of the lower cylinder 3, and the resulting relatively lower pressure in the lower cylinder 3 assists in keeping the double faced valve 19 closed, thus producing the desirable higher spring rate.

In the event that during a downward movement of the car body, a simultaneous upward movement of the wheel occurs, it is desirable to maintain the higher spring rate. As the downward body motion starts, the lower face of the double faced valve 19 will seat. The simultaneous upward motion of the wheel, causing the closing up of the cylinders, will start compression within the volume of the lower cylinder 3. This relatively higher pressure will assist in maintaining the seating of the lower face of the double faced valve 19, thus producing the desirable higher spring rate.

In the event that during a downward movement of the car body, a simultaneous downward movement of the wheel occurs, it is desirable to maintain the lower spring rate. As the downward body motion starts, the lower face of the double faced valve 19 will seat. The simultaneous downward motion of the wheel, causing the spreading apart of the cylinders, will start expansion within the volume of the lower cylinder 3. This expansion will immediately lower the double faced valve 19 and allow the expansion to continue uniformly throughout the entire volume of both the upper and lower cylinders, thus producing the desirable lower spring rate.

From the foregoing it will be apparent that movement of the lower cylinder 3, with respect to the upper cylinder 1, in either direction utilizes the entire volume of air contained in both cylinders for compression or expansion thus producing a low spring rate. However, any movement of the upper cylinder 1, with respect to the lower cylinder 3, utilizes only the volume of air in the cylinder 3, below the valve plate or seat 11, due to the closing and maintaining the valve 19 on said seat, by movement of the upper cylinder, thus producing a high spring rate. This provides a dual automatic spring rate controlled by movement of one cylinder with respect to the other. Any movement of the upper cylinder with respect to the lower cylinder results in a high spring rate. Any movement of the lower cylinder with respect to the upper results in a low spring rate. Any simultaneous unidirectional movement of the cylinders will maintain the low spring rate as there is no appreciable movement of the upper cylinder with respect to the lower to maintain the valve 19 closed.

What I claim is:

1. In a fluid spring comprising a pair of oppositely disposed cylinders, one of which is slidably positioned upon the other, gland means positioned at the inner end of the outer cylinder and adapted to slidably seal the said cylinders, the said gland means comprising a plurality of gaskets positioned in a flared end of one of the said cylinders, together with a valve assembly attached to the outer cylinder and positioned centrally within and between the said cylinders, the said valve assembly comprising a valve seat having an opening formed therein, a cylindrical housing positioned on the said valve seat, a coil spring positioned within the said housing and upon the said valve seat, a guide member positioned on the said coil spring and having depended therefrom and extending downwardly through the said valve seat opening a double faced valve, said double faced valve adapted to function with the said valve seat opening in controlling the expansion and compression of fluid within the said cylinders, depending upon the movement of the said cylinders, substantially as described.

2. A fluid spring comprising a pair of slidably engaging cylinders adapted to be attached to an automobile between the body and a wheel thereof, and having positioned within the said cylinders and attached to one of them an automatic valve assembly comprising a valve seat having a semi-floating double faced valve positioned thereon and functioning with the said valve seat in controlling the compression and expansion of fluid within and between the said cylinders in response to the movement of one or both of the said cylinders for the purpose of providing a dual rate spring.

3. A fluid spring comprising a pair of oppositely disposed slidably engaging cylinders, the outer ends of which are closed, brackets on these said outer ends of the cylinders adapted to be attached to an automobile body and an automobile wheel, a conical coil spring positioned within one end of one of the said cylinders, and a valve assembly positioned within the other one of the said cylinders and adapted to control the flow of fluid between the two cylinders, the said valve comprising a valve seat suspended from the said cylinder and a semi-floating double faced valve positioned within an opening in the said valve seat, the said double faced valve positioned on a coil spring positioned on the said valve seat and correctly aligned by means of a cylindrical housing and a guide functioning therein and attached to the said double faced valve, a gland between the circumferences of the said slidably engaged cylinders, and a housing adapted to protect the working parts of the device, substantially as described.

4. In an air spring comprising a pair of cylinders, one slidably engaged upon the other and of substantially larger diameter than the other so as to provide an air chamber between the walls of said cylinders, opposite ends of said cylinders being closed, means for forming a sealing gland between the said slidably engaging cylinders, a conical coil spring positioned within one end of one of said cylinders and a valve assembly positioned within and structurally attached to the other one of said cylinders, the said valve assembly comprising means for controlling the flow of air through the said valve, depending upon the motion of the cylinders so as to control the compression or expansion of air within the relatively small volume of the said cylinder of smaller diameter or the compression or expansion of air within the entire volume of the two cylinders, said means comprising a valve seat suspended within the air spring, and a semi-floating double faced valve positioned within an opening in the said valve seat by means of a coil spring positioned upon the said valve seat and aligned by means of a cylindrical housing and a guide slidably maintained therein upon the coil spring, an air valve in said lower cylinder providing means for inflating said air spring, and openings in said lower cylinder providing means for lubrication.

5. A valve for automatically varying the spring rate of an air spring so as to limit compression or expansion of the air within a small portion of the volume of the air spring or to permit uniform compression or expansion within the entire volume of the air spring, said valve comprising a valve seat suspended within an air spring, and a semi-floating double faced valve positioned within an opening in the said valve seat by means of a coil spring positioned upon the said valve seat and aligned by means of a cylindrical housing and a guide slidably maintained therein upon the coil spring.

6. A fluid spring comprising a pair of opposed open end telescoping cylinders with a compressible fluid sealed therein, said cylinders being of a different size, a valve plate partitioning said cylinders and carried by the larger cylinder for sliding movement in the smaller cylinder and a normally open valve closed only by positive movement of the larger cylinder and plate in either direction.

7. A fluid spring comprising a pair of opposed open end telescoping cylinders with a compressible fluid sealed therein, a normally open closure interposed between said cylinders operable to prevent the flow of fluid therebetween, and means to operate said closure upon movement of one cylinder with respect to the other and to maintain it inoperable upon movement of the other cylinder with respect to the first mentioned or unidirectional therewith.

8. A fluid spring comprising a pair of opposed open end telescoping cylinders with a compressible fluid sealed therein, a normally open closure interposed between said cylinders operable to prevent the flow of fluid therebetween, and said closure being carried by one of the cylinders and operable only by positive movement of said cylinder.

9. A fluid spring comprising a pair of slidably engaged cylinders adapted to be attached to an automobile between the body and a wheel thereof, and having positioned within the said cylinders and attached to one of them an automatic valve assembly controlling the compression and expansion of fluid either within a cylinder or between the cylinders in response to the movement of one or both of said cylinders for the purpose of providing a dual spring rate.

10. A fluid spring comprising a pair of opposed open end telescoping cylinders with a compressible fluid sealed therein, a valve assembly interposed between said cylinders including a valve operable to prevent the flow of fluid therebetween, and said valve assembly being carried by one of the cylinders with the valve operable only upon movement of said cylinder and not affected by the fluid flow upon movement of the other cylinder.

11. A fluid spring comprising a collapsible and expansible casing with a compressible fluid sealed therein, and a valve within the casing and operable by movement of a portion thereof to automatically vary the spring rate so as to limit compression or expansion of the fluid within a small portion of the volume of the spring or to permit uniform compression or expansion within the entire volume of the spring.

12. A fluid spring comprising a collapsible and expansible casing with a compressible fluid sealed therein, and a valve within the casing and operable by movement of a portion thereof to automatically vary the spring rate by limiting compression or expansion of the fluid to a small portion of the volume of the spring, and inoperable upon movement of another portion of the casing to permit uniform compression or expansion of the entire volume of the spring.

13. A fluid spring comprising a pair of opposed open end telescoping cylinders with a compressible fluid sealed therein, a valve plate partitioning said cylinders and carried by one of the cylinders, and a normally open valve closed by positive movement in either direction of the cylinder and plate and maintained closed by such movement except upon a simultaneous movement in the same direction of the other cylinder.

14. A fluid spring comprising a pair of opposed open end telescoping cylinders with a compressible fluid sealed therein, said cylinders being of different size, a valve plate partitioning said cylinder and carried by the larger cylinder for sliding movement in the smaller cylinder, and a normally open valve closed by positive movement in either direction of the larger cylinder and plate and maintained closed by such movement except upon a simultaneous movement in the same direction of the smaller cylinder.

ARTHUR R. PARILLA.